United States Patent [19]

Duty et al.

[11] 3,708,958
[45] Jan. 9, 1973

[54] DEVICE AND METHOD FOR REMOVING POLLUTANTS FROM STACK GASES

[76] Inventors: Cermillus H. Duty, 3233 Lexington Drive, Saginaw, Mich. 48601; Steven J. Stuit; Jack B. Stuit, both of 5558 Michael Drive, Bay City, Mich. 48706

[22] Filed: July 19, 1971

[21] Appl. No.: 163,932

[52] U.S. Cl. .......................... 55/89, 55/90, 55/228, 55/233, 261/111, 261/117
[51] Int. Cl. ................................. B01d 53/14
[58] Field of Search .......... 55/84, 89, 90, 93, 94, 223, 55/228, 233; 261/111, 117

[56] References Cited

UNITED STATES PATENTS

| 3,327,455 | 6/1967 | Wertheiner | 55/223 |
| 3,456,928 | 7/1969 | Selway | 55/223 |

*Primary Examiner*—Charles N. Hart
*Attorney*—Edward E. Schilling

[57] ABSTRACT

Apparatus for removing smoke particles and water soluble combustion gases from stack gases, e.g., of roofing tar heaters and supermarket incinerators, having a body shell in which the stack gas is directed upwardly around at least three vertically aligned and centrally disposed baffle elements, each defining an annular space between the periphery thereof and the body shell, an associated peripheral deflector skirt for each baffle element positioned slightly thereabove and baffling the annular space thereabout and being contiguous to the body shell, a horizontally disposed array of downwardly directed steam nozzles positioned between the associated baffle element and deflector skirt combination above the lowest most baffle element and deflector skirt, and a similar array of water nozzles between the uppermost baffle element and deflector skirt combination, the stack gas exiting from the body shell to a chimney pipe. Each of the peripheral deflector skirts, and each of the baffle elements except the lowest one, are formed of foraminous metal shells such as perforated metal and filled with an activated adsorbent material such as activated anthracite, the lowest most baffle being imperforate. Drains are provided in the floor of the body shell and preferably lead the steam condensate and collected water spray to a filter unit from which water is recycled to the water nozzles. Additional scrubbing capacity is provided by either or both of placing opposed water sprays in the chimney pipe or by utilizing a fourth baffle element and peripheral skirt combination between the water sprayed and steam sprayed combinations, such fourth combination being either steam sprayed or water sprayed as may be required.

The method of removing smoke particles and soluble combustion gases from stack gases comprises leading the stack gas through the apparatus described while utilizing little more than sufficient steam in combination with the activated adsorbent to absorb and remove visible smoke particles and enough water to take up the steam but insufficient to interfere seriously with the draft, and collecting the scrubbed materials in the condensed steam and the water and draining them out of the apparatus, preferably to a filter unit from which recycle water is obtained.

15 Claims, 12 Drawing Figures

PATENTED JAN 9 1973 3,708,958

INVENTORS.
Cermillus H. Duty
Steven J. Stuit
Jack B. Stuit
BY Edward E. _____
ATTORNEY

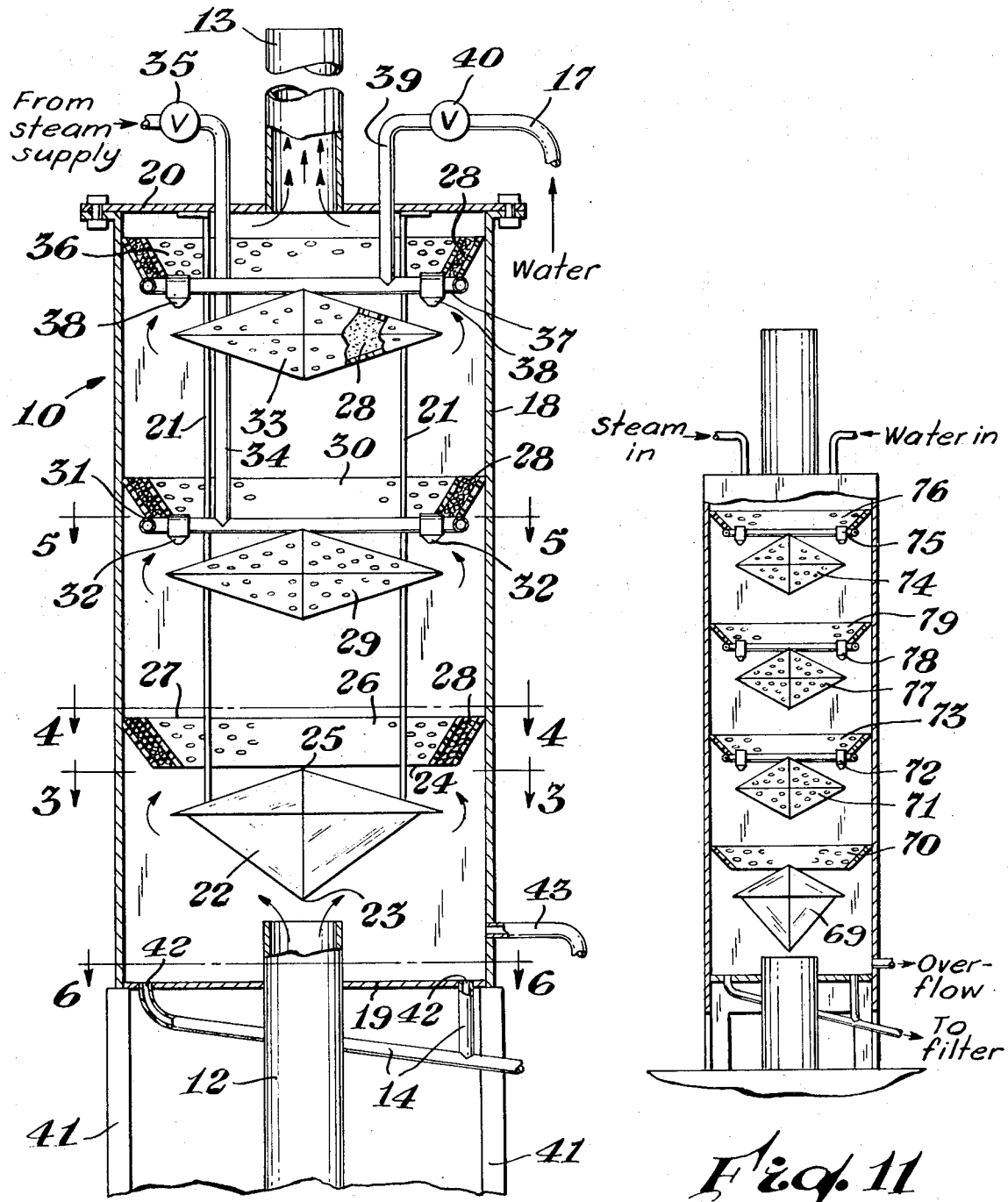

INVENTORS.
Cermillus H. Duty
Steven J. Stuit
Jack B. Stuit
BY Edward E. Schilling
ATTORNEY

DEVICE AND METHOD FOR REMOVING POLLUTANTS FROM STACK GASES

BACKGROUND OF THE INVENTION

1. Field of the Invention

The invention relates to apparatus and method for removing smoke particles and water soluble combustion gases from stack gases from roofing tar heaters, supermarket incinerators, and the like, in which are employed baffles and steam and/or water sprays for scrubbing the stack gases.

2. Description of the Prior Art

Heretofore many attempts have been made to provide scrubber units which are efficient and economical and reliable in operation but none of these appear to have met the needs of the marketplace, especially for the smaller units, many of which must be portable. Various baffles and spray combination units have been tried but each suffers from some drawback such as insufficient removal of pollutants from the combustion gases, or problems have been encountered in attempting to recycle the collected water and/or the steam condensate. Some have attempted to use baffles which bring about intimate contact between scrub water and the gases, but these generally hinder the draft through the unit to an undesirable degree when operated so as to sufficiently remove pollutants.

OBJECTS OF THE INVENTION

It is a principal object of the invention to provide apparatus for the efficient, reliable and economical removal of smoke particles and water soluble combustion gases from the stack gases of roofing tar heaters, supermarket incinerators, and the like, as well as from the stack gases of larger combustion devices.

It is a further object of the invention to provide apparatus of the class described in which the pollutants are scrubbed out with a combination of steam and water and activated adsorbent in such a way that the pollutants do not form a gummy mass which interferes with recycling of the collected steam condensate and water spray.

Still another object of the invention is to provide scrubbing apparatus which is capable of being transported with the source of stack gases, as in the case of the roofing tar heaters.

Yet another object is to provide a method of efficiently and economically removing smoke particles and water soluble combustion gases from stack gases adequate to meet the more stringent needs of present day pollution control standards.

SUMMARY OF THE INVENTION

It has now been discovered that upon leading stack gas upwardly through a body shell containing baffle elements and associated peripheral skirts, and, a steam spray and a water spray each directed on respective baffle elements and the zone of gas flow therearound, the baffle elements, except the lowermost, and the deflector skirts each having a foraminous shell and being filled with an activated adsorbent, all as hereinafter more fully described, smoke particles and water soluble combustion gases are efficiently removed from the stack gas and the collected solids are brought into a form which is readily carried away with collected steam condensate and water and filtered and recycled to the water sprays.

SUMMARY DESCRIPTION OF THE DRAWINGS

FIG. 2 is a fragmentary view, mostly broken away and shown in vertical section, of the scrubber unit of the invention illustrated in FIG. 1.

FIG. 11 is a largely schematic view in front elevation, mainly broken away and shown in vertical section, of an embodiment of the apparatus of the invention in which a fourth baffle element, a third peripheral deflector skirt and a third array of spray nozzles are employed.

DESCRIPTION OF THE INVENTION

Figure 1:
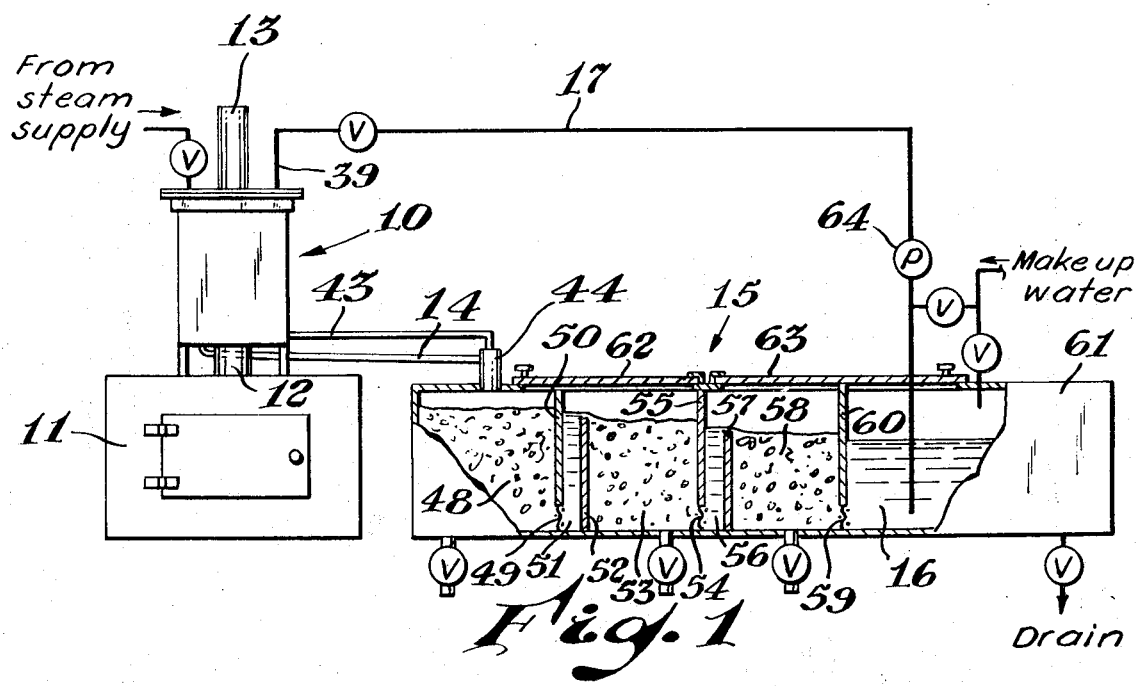
FIG. 1 is a view in front elevation, partly schematic and partly broken away and in section, showing an embodiment of the apparatus of the invention in combination with an incinerator, and including a unit for filtering and recycling collected steam condensate and water.
Figure 3:
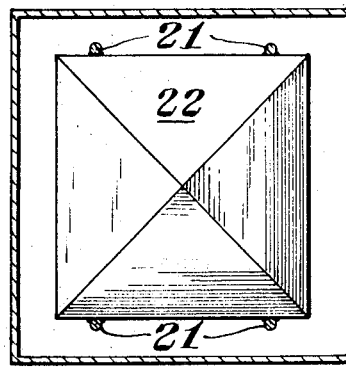
FIG. 3 is a view in horizontal section taken along line 3—3 of FIG. 2 and slightly reduced, showing the upper side of the lowermost baffle element and its spatial relationship to the surrounding body shell.
Figure 4:
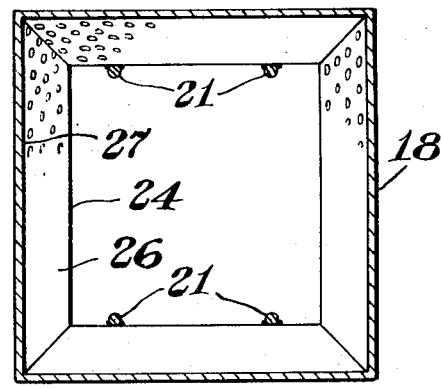
FIG. 4 is a view in horizontal section taken along line 4—4 of FIG. 2 and slightly reduced, showing the upper side of the lowermost peripheral deflector skirt and surrounding body shell but omitting the associated baffle element for simplicity of illustration.
Figure 5:
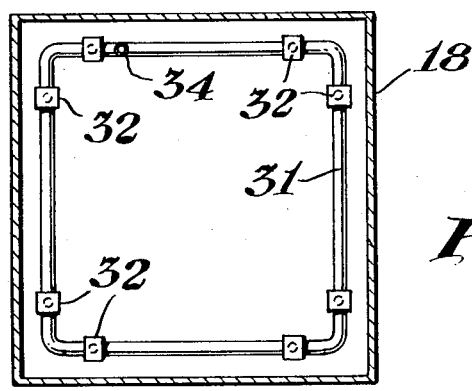
FIG. 5 is a view in horizontal section taken along line 5—5 of FIG. 2 and slightly reduced, showing the upper side of the manifold and nozzles used for spraying or scrubbing the associated parts and the stack gas with steam, but omitting the associated baffle element for simplicity of illustration.
Figure 6:
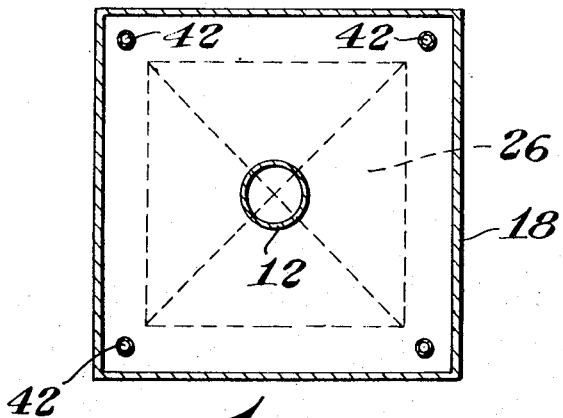
FIG. 6 is a view in horizontal section taken along line 6—6 of FIG. 2 and slightly reduced, showing the drains in the floor of the body shell and with the baffle element shown in dotted outline to illustrate the alignment with respect to the corners of the baffle element.

Referring to FIG. 1, the apparatus of the invention is shown as a scrubber unit, indicated generally by the reference numeral 10, mounted on top of an incinerator 11, receiving the stack 12 of the incinerator through the lower end of the unit, and exiting the scrubbed gas from a chimney pipe 13. A drain conduit 14 leads steam condensate and water from the scrubber unit 10 to an associated filter unit, generally indicated by the reference numeral 15, from which recycle water 16 is returned to the scrubber unit 10 via water supply line 17.

Referring more particularly to FIG. 2, the scrubber unit 10 is seen to consist of a body shell 18 having a floor 19 through which the stack 12 of the incinerator 11 extends, and a removable cover plate 20 in which the chimney pipe 13 is mounted. Suspended from the cover plate 20 by means of hanger rods 21, or any other suitable support means, and in spaced apart relationship, are each of the baffle elements and the peripheral deflector skirts. While it is convenient to mount these elements on the cover plate for ready removal, if desired, each element may also be mounted on brackets attached to the body shell in the event even occasional removal of the elements is not contemplated.

The lowermost baffle element 22 shown is a hollow, substantially square, bipyramidal member, the pyramids having substantially a common base. Preferably the upper pyramidal shell is made slightly larger in baseline dimensions and the lower shell is fitted up in to it so that a portion of the upper shell extends out over all parts of the perimeter of the lower shell and provides a drip edge. This construction is preferred over a true bipyramid as it avoids the problem of cascading and dripping water and steam condensate running down over the periphery of the baffle element formed by the juncture of the pyramidal portions onto the lower pyramid and down to the lower apex 23 thereof and dripping down into the stack 12 and into the incinerator or other combustion unit.

Mounted slightly above the baffle element 22 with the lower edge 24 about level with the upper apex 25 of the baffle element is a peripheral deflector skirt or flange 26, which baffles the annular space around the baffle element 22 and is, at its upper edge 27, contiguous to the body shell 18. The deflector skirt 26 is formed in four connecting sections corresponding to the four sides of the body shell 18. In each section substantially parallel spaced apart perforated metal plates enclose a charge of particulate, activated, hot water insoluble, inorganic adsorbent 28, the sections being substantially closed, along the upper and lower edges thereof, in order to retain particulate adsorbent.

The adsorbent 28 is preferably a high surface area material which provides a surface with numerous active sites for action on the smoke particles and combustion gases in a manner which appears to be essential, but is not entirely understood. As indicated, the adsorbent must be activated, and resistant to the eroding action of hot water and steam. Examples of suitable adsorbents are anthracite activated by exposure to an atmosphere of steam at a temperature above 100° C. and preferably above about 130° C., and gamma alumina.

Mounted above the deflector skirt 26 and vertically spaced apart therefrom is another baffle element 29 and deflector skirt 30 with similar horizontal relationships and vertical spacing to those just described, except that the vertical dimension of baffle element 29 is not as great, and a manifold 31 with downwardly directed steam nozzles 32 coupled in series therein, or simply thereto, is positioned between the baffle element 29 and the deflector skirt 30 to provide a horizontal array of steam nozzles around the periphery of the baffle element. The manifold 31 is positioned close up to the lower edge of the deflector skirt 30 and nozzles are employed which preferably have a rather wide angle of dispersion of spray emitted, e.g., about 120°, so that the space or annulus between the baffle element and deflector skirt is readily completely scrubbed by a continuous curtain of steam which also impinges upon and permeates the baffle element 29 and its content of activated particulate material of the same or similar nature to that used in the deflector skirt 26. The baffle element 29, as shown, is formed of a hollow shell of foraminous metal filled with a charge of activated adsorbent, the construction being more apparent from the cutaway section shown in the baffle element 33 which is constructed in the same manner.

A supply line 34 for steam extends down to the manifold 31 from the cover plate 20 and is controlled by valve 35. The steam is supplied by a gasoline fired steam generator, not shown, or other suitable means, sometimes, simply a coil of water supply pipe placed in the combustion chamber of the incinerator or tar heater or other device whose stack gas is being scrubbed. If desired, the steam supply line 34 may be used as the means for support of the associated baffle element 29 and deflector skirt 30, and the lower baffle element 22 and deflector skirt 26 may be hung therefrom by short hanger rods, instead of using longer hanger rods suspended from the cover plate 20.

Mounted above the deflector skirt 30 and vertically spaced apart therefrom is another baffle element 33 and deflector skirt 36 with an intervening manifold 37 with downwardly directed water spray nozzles 38 with substantially the same vertical and horizontal relationships therebetween and to the body shell as just described for deflector skirt 30 and its associated nozzle array and baffle element. The baffle element 33 is constructed like baffle element 29, and deflector skirt 36 is constructed like deflector skirts 26 and 30. Water is supplied to the manifold 37 by means of a supply line 39 controlled by valve 40.

Referring to FIG. 1 it may be seen that water may be supplied from a tap, not shown, or by recycling water from the filter unit 15 through the supply line 17.

The spray nozzles 38 are preferably of the type described with respect to the steam scrub in that a wide angle spray, i.e., a conical spray, is best to assure a complete curtain of spray in the space or zone between the baffle element 33 and the deflector skirt 36 while minimizing the number of nozzles needed. Likewise, if desired, the water supply line 39, by means of suitable brackets or tack welds, may be used as the means of support of the associated baffle element and deflector skirt.

The whole scrubber unit 10 is supported above the incinerator or other source of stack gas in any suitable manner, e.g., with the legs 41 shown, although the body shell 18 may also be extended down sufficiently to serve as a support, except that it is generally desirable to not completely enclose the drain lines 14 which connect to the corner drain openings 42 in the floor 19, since the accumulated aqueous scrubbings are generally very hot and it is best to cool the liquid somewhat before it is directed into the filter unit 15. To permit some cooling, the body shell may have portions thereof cut out around the drain lines in a manner similar to that shown in FIG. 11.

As may be seen by reviewing FIGS. 2, 3, 4, 5 and 6 together, all the baffle elements and the deflector skirts have their sides and corners mutually aligned and the drain openings 42 in the corners of the floor 19 of the scrubber unit are aligned with the corners of the baffles and skirts. It has been found that this configuration is highly beneficial to getting the light, fluffy scrubbed solids, washed down from the baffle elements and deflector skirts, to carry down the drain with water draining from the scrubber unit, as the flow off the main portion of the straight sides of the baffle elements to the floor 19 then moves directly to the drain openings. In contrast, locating the drains between the corners results in the light fluffy solids having a tendency to be pushed back into the corners and accumulating without being carried down the drain by the flow of water.

An overflow line 43 positioned in the body shell wall 18 just below the level of the top of the stack 12 of the incinerator 11 prevents an undue accumulation of draining scrub water from flowing into the stack 12 in the event the drain openings 42 become entirely or partly blocked.

Figure 12:
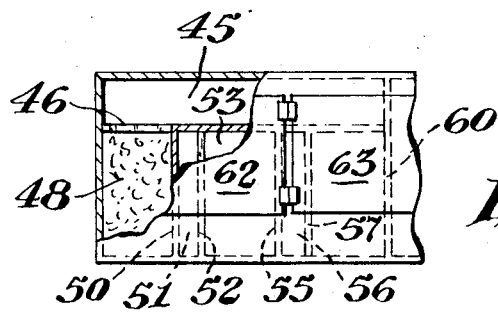
FIG. 12 is a fragmentary top plan view, partly broken away and in section, of the filter unit shown operatively connected to the scrubber unit in FIG. 1.

Turning now to FIGS. 1 and 12, it may be seen that the overflow line 43 and the drain line 14 are conveniently brought together into a header 44 which delivers the accumulated steam condensate and water, i.e., scrub water, into the enclosed filter unit 15, preferably into a first chamber or surge tank 45, from which the aqueous liquid flows over a partition 46 which serves as a weir, and onto a bed 48 of particulate material which is usually of gravel somewhat finer than pea gravel, although particulate charcoal or activated anthracite may be used if desired. The water flows down through the bed of particulate material and out through a screen 49 at one side at the bottom of partition 50 where it wells up in a small compartment 51 defined by partition 50 and another partition 52. Partition 52 serves as a weir to the next compartment which contains a bed 53 of particulate material which may be gravel or charcoal, but is preferably activated charcoal or activated anthracite or equivalent adsorbent material. The water overflowing partition 52 spreads over and down through the bed 53 and out at one side through a screen 54 at the bottom of partition 55 where it wells up in another small compartment 56 defined by partition 55 and another partition 57. The partition 57 serves as a weir to yet another compartment which contains a bed 58 of particulate material which may be gravel or charcoal but is preferably activated charcoal or activated anthracite or equivalent adsorbent material. The water flowing down through the bed 58 exits through a screen 59 at the bottom of the partition 60 which separates the third bed from the reservoir 61 for filtered clarified water 16 which is usable for recycling to the scrubber unit 10. The number of beds of particulate material used in making up a filter unit is not critical and may be a greater or lesser number than shown. However, three beds works out to be convenient in practice, considering the ease of cleaning out and servicing the unit and the degree of clarification desired.

Doors 62 and 63 in the cover plate of the filter unit permit cleaning out any clogged particulate beds or replacing the beds and clogged screens can also be serviced. If pH adjustment of the water to be recycled is desired or necessary, chemical additions may be made in any chamber, generally in reservoir 61. Thus it may be desirable to add sodium bicarbonate or soda ash or other alkalizing agent if the combustion gases are particularly acidic in nature. The recycled water is returned to the scrubber unit 10 through water supply line 17 by means of a pump 64, with or without addition of make-up water, such as tap water. A typical portable filter unit is operated with a total water inventory of about 200–300 gallons wherein water is supplied to the scrubber unit at about 30–40 p.si.g.

Figure 10:
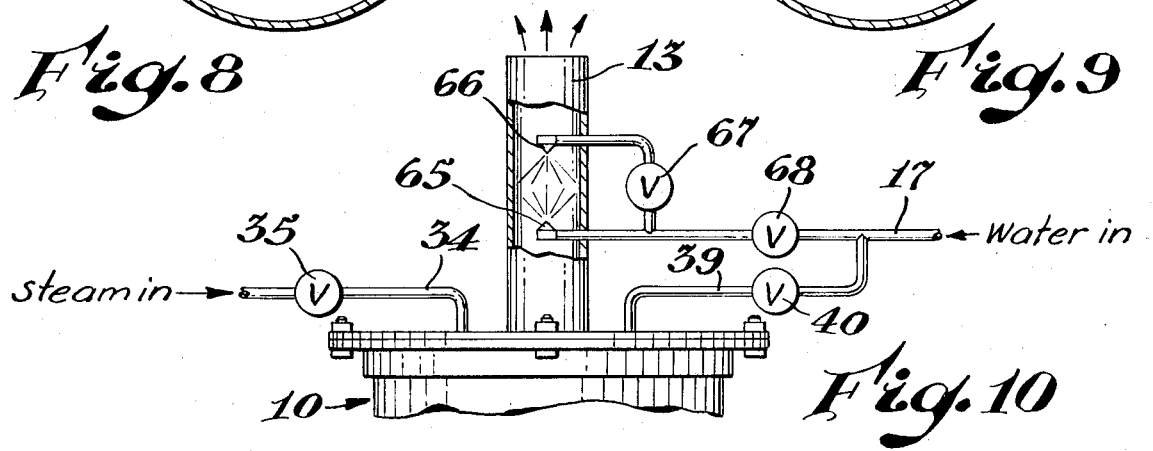
FIG. 10 is a fragmentary view, partly broken away and in section of the upper part of a front elevation of a scrubber unit similar to that shown in FIG. 1, but having supplementary opposed water sprays in the chimney pipe that serves as an exit from the main scrubber unit.

If scrubbing with the scrubber unit 10 shown in FIGS. 1 and 2 is not sufficient to take out substantially all the pollutant combustion gases, additional scrubbing may be carried out using opposed water sprays in the chimney pipe 13 using a modification such as that shown in FIG. 10. On appropriately balancing the flow to the lower spray nozzle 65 against the flow of water to the upper nozzle 66, using valves 67 and 68, interference with the draft of stack gas through the unit is minimized. The opposed sprays may be used also with the embodiment of the invention shown mainly schematically in FIG. 11.

The embodiment shown in FIG. 11 utilizes an additional baffle element, deflector skirt and spray nozzle array combination to achieve more scrubbing of heavily laden stack gas or stack gas being poured out under a great deal of forced draft, although the embodiment of FIGS. 1 and 2 generally handles most any stack gas under forced draft or natural induced draft conditions with appropriate adjustment of the steam and water flow rates. The embodiment of FIG. 11 utilizes an imperforate lowest baffle 69 and an associated deflector skirt 70, just as does the first described embodiment. The next adjacent baffle element 71, nozzle array 72 and deflector skirt combination utilizes steam as the scrubbing fluid. The topmost baffle element 74, nozzle array 75 and deflector skirt 76 combination utilizes, as the scrubbing fluid, water. The combination of baffle element 77, nozzle array 78 and deflector skirt 79 just below the top-most combination may be supplied with steam to take out more smoke particles, or water to scrub out more steam or invisible water soluble combustion gases, as the situation may indicate.

The number of nozzles to use to obtain adequate scrubbing of the space between any given baffle element and the next above adjacent deflector skirt depends on several factors such as the angle of dispersion which the nozzles selected are inherently made to throw, as well as the size of the scrubber unit. Four to six nozzles per array, each nozzle dispersing spray out in a 120° cone, appear to be adequate on smaller units up to about 24 inches square in section, while larger units will take additional nozzles with increasing size.

The unit may be constructed largely out of mild steel, such as No. 1010 alloy grade, though for heavier service at higher temperatures or in the case of exposure to more corrosive gases, it may be desirable to make the unit from a chrome steel or from stainless steel, such as 304 or 316 alloy.

In selecting the vertical spacing between each baffle element and the associated deflector skirt, the space should be sufficient to provide a cross sectional area transverse to the direction of flow of stack gas at least as great as that found in the stack of the incinerator or other combustion device being served. In units serving a combustion device operated with a forced draft, it is often helpful to increase the vertical spacing slightly between the baffle element and the deflector skirt to increase the cross section to flow and thus decrease the resistance to gas flow through the scrubber unit.

In rather small units it appears to be adequate for many types of service to utilize about 10 pounds per square inch(gauge) pressure of each of steam and water to the spray manifolds. In medium size units 20 to 40 pounds pressure appear to be required to service a larger number of nozzles, and this generally increases according to the principles of fluid flow as the number of nozzles is further increased.

In carrying out the method of the invention using the apparatus described, the combustion unit is started up and steam is admitted to the steam nozzle array or arrays at steadily increasing flow until visible smoke substantially disappears from the effluent from the chimney pipe. The water flow is then commenced through the water spray nozzles and just sufficient is used, preferably, to make the steam disappear from the chimney pipe effluent. The water flow must be sufficient to wash out the free space between the baffle element and the deflector skirt associated with the water spray nozzles, wet down the baffle element and wash part of the adjacent body shell wall area, but stop short of serious interference with the draft through the unit. Likewise, for effective operations, the flow of steam impinging on the adjacent baffle element must be sufficient to permeate the baffle element and bring on effective use of the activated particulate adsorbent material. Once operations are under way the flow of steam may be halted intermittently for periods of about 1 to 2 minutes without adversely affecting pollutant removal, but it is generally simplest and best to maintain continous steam flow.

Figure 7:
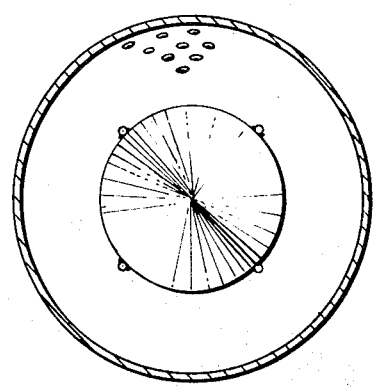
FIGS. 7, 8 and 9 are views similar to those shown in FIGS. 3, 4 and 5, respectively, but of a scrubbing unit which is round in section instead of square.
Figure 8:
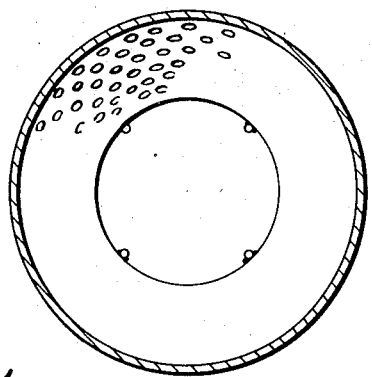
Figure 9:
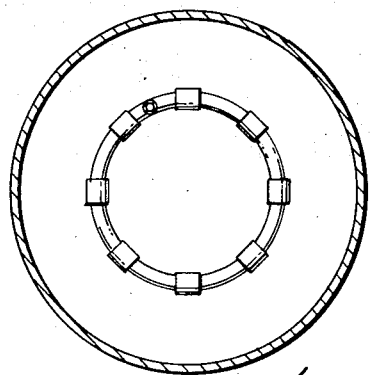

While the scrubber unit has been shown square in section, which is easiest to manufacture, it may also be rectangular in section, with the baffle elements in the form of rectangular pyramids. If desired, the scrubber unit may be made circular in section, in which case the baffle elements will be conical instead of pyramidal, the deflector skirts will baffle a circular annular space, and the nozzle array will generally be circular, as shown in FIGS. 7, 8 and 9, which views correspond to FIGS. 3, 4 and 5, and the location of the drains in the floor of the body shell will have to be determined by trial and error according to where the flow and drip off the baffles is least so that heavier flows from other portions of the floor will sweep the solids to the drain openings.

Also, the foraminous shells of the baffle elements and deflector skirts, while shown made of a perforated metal sheet may also be made of a good grade of heavy wire screen or hardware cloth with openings appropriate in size to hold particles which are preferably in a size range averaging about one-eighth inch to three-eighths inch major dimension, but generally about one-fourth inch diameter or major dimension. The wire must also be of a heavy enough gauge to hold the particulate material without sagging when the unit is at operating temperatures.

We claim:

1. Device for removing pollutants from stack gases containing the same which comprises:
    a body shell having a sidewall, a top wall and a bottom wall;
    means for conducting stack gases to the interior of the body shell to a zone above and adjacent the said bottom wall, said zone being about concentric to the said sidewall;
    at least three baffle elements disposed spaced apart substantially vertically above the said zone and substantially vertically aligned therewith, each baffle element having substantially greater horizontal dimensions than vertical, the horizontal dimensions being substantially regular so as to be largely planar, and the vertical dimension being generally greatest in the center of the element and least at the horizontal periphery, the lowest most baffle element being an imperforate flow directing member positioned above and adjacent to said zone, the remaining baffle elements each being in the form of a hollow shell made of foraminous metal and filled with a particulate, activated, hot water insoluble, inorganic adsorbent of a particle size readily retained by the foraminous metal, each baffle element having substantially equal length and width in the horizontal dimension defining a regular annular spacing between the baffle element and the sidewall of said body shell;
    at least three flange-like peripheral deflector skirts, one of said deflector skirts being associated with each baffle element, each deflector skirt having one continuous upper edge closely abutting the sidewall, and extending downwardly and inwardly therefrom, and an inner edge disposed above, adjacent and in substantially vertical alignment with the periphery of the associated baffle element, each peripheral deflector skirt being formed from slightly spaced apart substantially coplanar pieces of foraminous metal sheet having the space between the coplanar pieces filled with particulate activated substantially hot water insoluble inorganic adsorbent and closed sufficiently along said inner edge to retain said adsorbent;
    a horizontally disposed array of downwardly directed nozzles and a manifold therefor disposed between each associated baffle element and peripheral deflector skirt above the lowest most baffle element, each said array being aligned along and immediately adjacent said inner edge of said associated peripheral deflector skirt, the nozzles being pre-selected and disposed and adapted to create at least contiguous spray patterns of fluid throughout all the spaces between the inner edges of the peripheral deflector skirts and the peripheries of the associated baffle elements;
    a first supply conduit adapted to bring steam to at least the lower most nozzle array and a second supply conduit adapted to bring water to the at least one remaining uppermost nozzle array;
    support means for maintaining the baffle elements, nozzle arrays and peripheral deflector skirts in predetermined substantially vertically aligned relationship;
    means for conveying stack gas upwardly away from a zone above the upper most baffle element and out of the body shell; and
    plural drain means for collecting and removing water and steam condensate collecting on the bottom wall of said body shell.

2. The device as in claim 1 in which each of the body shell, the baffle elements and the peripheral deflector skirts are square in section, the common corners and sides of the elements of each associated group being substantially vertically aligned and each group being substantially aligned, and said drain means being four drain ports in said bottom wall, each drain port being closely adjacent a corner of the body shell.

3. The device as in claim 2 in which the baffle elements are substantially pyramidal in form.

4. The device as in claim 1 in which the adsorbent is a material selected from the group consisting of activated anthracite and gamma alumina.

5. The device as in claim 1 in which the peripheral deflector skirts and all but the lower most baffle elements are hollow and formed of sheet metal having close spaced perforations therethrough of a diameter to retain particulate material in the size range of about 0.125 inch to about 0.375 inch major dimension.

6. The device as in claim 1 in combination with a combustion device producing polluted stack gas.

7. The device as in claim 1 together with a filter unit having at least two particulate filter beds connected in series, at least one said bed being filled with particulate activated hot water insoluble inorganic adsorbent, the drain means being adapted to convey liquid from said bottom wall of the body shell to said filter unit.

8. The device as in claim 7 wherein pump means, control valve means and conduit means are provided for returning filtered liquid from the filter unit to the said at least one remaining upper most nozzle array.

9. The device as in claim 8 in which the filter unit and the device for removing pollutants are both substantially portable along with a combustion device.

10. A first device as in claim 1 disposed above and adapted to receive the stack gas exiting from a second device as in claim 1.

11. The device as in Claim 1 in which the means for conveying stack gas out of the body shell is provided with upper and lower vertically opposed spray means separately controllable in volume whereby stack gas may be further scrubbed with minimal interference with upward flow of stack gas.

12. The method of reducing the gaseous and particulate pollutant content of a stack gas containing the same which comprises:
  conveying the stack gas into an enclosed treatment scrubber;
  within said scrubber directing stack gas and steam simultaneously against a foraminous hollow baffles filled with a particulate activated hot water insoluble inorganic adsorbent;
  concurrently passing stack gas through a curtain of steam spray surrounding said foraminous hollow baffle;
  then directing so-treated stack gas and aqueous liquid simultaneously against a second foraminous hollow baffle filled with a particulate activated hot water insoluble inorganic adsorbent;
  concurrently passing stack gas through a curtain of aqueous liquid spray surrounding said second foraminous hollow baffle;
  collecting and removing aqueous liquid and steam condensate from the treatment scrubber; and
  exiting treated stack gas from the treatment scrubber.

13. The method as in claim 12 in which the aqueous liquid and steam condensate collected and removed from the treatment scrubber are filtered and re-used as the aqueous liquid.

14. The method as in claim 12 in which the enclosed treatment scrubber is a rectangular vessel substantially square in section and the aqueous liquid and steam condensate are directly primarily to the sides of the square floor of the vessel as a collection process and the collected liquid exits from a drain in substantially each corner of said floor as the removal process.

15. The method as in claim 12 in which the volume of steam used within the treatment scrubber is at least sufficient to substantially remove visible smoke from treated stack gas and the volume of aqueous liquid used within the treatment scrubber is sufficient to remove visible steam from treated stack gas but less than that which substantially interferes with the draft of the stack gas through the treatment zone.

* * * * *